United States Patent [19]

Pham et al.

[11] Patent Number: 5,362,462
[45] Date of Patent: Nov. 8, 1994

[54] PROCESS FOR NITROGEN OXIDES REDUCTION

[75] Inventors: Hoanh N. Pham; Todd A. Shirley, both of Allentown, Pa.

[73] Assignee: Air Products and Chemicals, Inc., Allentown, Pa.

[21] Appl. No.: 68,725

[22] Filed: May 26, 1993

[51] Int. Cl.$^5$ .................. B01D 45/16; B01D 53/34
[52] U.S. Cl. ............................. 423/235; 95/261; 95/271
[58] Field of Search .......... 423/235, 239.1; 95/219, 95/232, 261, 271; 55/459.1

[56] References Cited

U.S. PATENT DOCUMENTS 4,375,455  3/1983  Teller et al. .................... 423/235
4,519,990  5/1985  Bevilaqua et al. ............. 423/243.01
4,756,890  7/1988  Tang et al. ..................... 423/235

FOREIGN PATENT DOCUMENTS 0176293  9/1985  European Pat. Off. ...... F23C 11/02

Primary Examiner—Wayne Langel
Assistant Examiner—Stephen G. Kalinchak
Attorney, Agent, or Firm—Robert J. Wolff; William F. Marsh; James C. Simmons

[57] ABSTRACT

The present invention is an ammonia injection scheme for enhanced $NO_x$ reductions wherein the $NO_x$ containing gas to be treated is upstream of a cyclone separator. The enhanced $NO_x$ reductions is accomplished by injecting the ammonia through the inside wall of the cyclone inlet duct.

4 Claims, 1 Drawing Sheet

PROCESS FOR NITROGEN OXIDES REDUCTION

TECHNICAL FIELD

The present invention relates to a process for reducing the concentration of nitrogen oxides ($NO_x$) in a $NO_x$ containing flue gas.

BACKGROUND OF THE INVENTION

Processes for reducing the concentration of $NO_x$ (a common industrial pollutant) in a $NO_x$ containing gas are well known in the art. These processes generally comprise:

(a) withdrawing the $NO_x$ containing flue gas as portion of the combustion effluent from the combustion of a carbonaceous fuel (fluidized-bed boilers are among the most efficient devices for burning carbonaceous fuels; the $NO_x$ is primarily formed from the oxidation of fuel-bound nitrogen);

(b) injecting ammonia into the $NO_x$ containing flue gas in order to reduce the concentration of $NO_x$ in the flue gas (the reduction of $NO_x$ by ammonia is feasible within a narrow temperature range of approximately 1600° F.–2000° F. with an optimum temperature of about 1785° F; at higher temperatures, the ammonia is converted to $NO_x$ while at lower temperatures, reduction of $NO_x$ by ammonia is less effective); and (c) feeding the ammonia treated flue gas to a cyclone in order to separate entrained particulate matter from the ammonia treated flue gas.

See for example European published patent application No. 176,293 by Cooper et al. U.S. Pat. No. 4,756,890 by Tang et al. teaches that the efficient mixing of the ammonia with the flue gas will result in increased $NO_x$ reductions for a given volume of injected ammonia. Tang therefore suggests that the ammonia be injected into the flue gas immediately following its entry into the cyclone's vortex region via the use of probes inserted through the top of the cyclone. There is a problem with Tang's technique, however, in that it is difficult to maintain these probes in such a hot and erosive environment for a long period of time. It is an object of the present invention to develop an ammonia injection scheme that will result in increased $NO_x$ reductions for a given volume of injected ammonia without resorting to the use of Tang's probes.

SUMMARY OF THE INVENTION

The present invention is an ammonia injection scheme for enhanced $NO_x$ reductions wherein the $NO_x$ containing gas to be treated is upstream of a cyclone separator. The enhanced $NO_x$ reductions is accomplished by injecting the ammonia through the inside wall of the cyclone inlet duct.

DETAILED DESCRIPTION OF THE INVENTION

Figure 1:
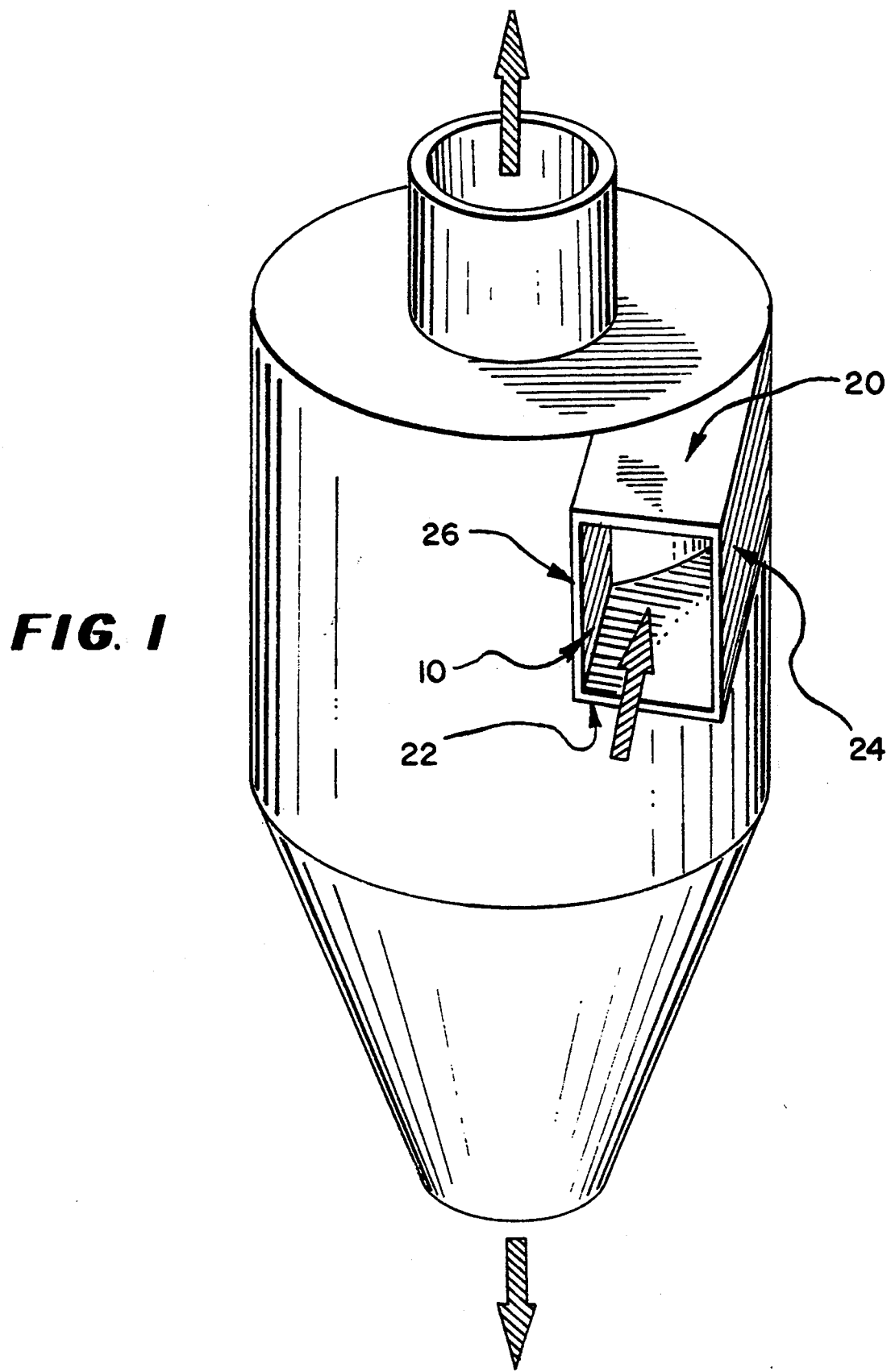
FIG. 1 is a drawing of a standard cyclone which is useful in describing the process of the present invention.

The present invention is an improved process for reducing the concentration of $NO_x$ in a $NO_x$ containing flue gas. In the process to which the improvement of the present invention pertains:

(a) the $NO_x$ containing flue gas is withdrawn as a portion of the combustion effluent from the combustion of a carbonaceous fuel;

(b) ammonia is injected into the $NO_x$ containing flue gas in order to reduce the concentration of $NO_x$ in the flue gas; and (c) the ammonia treated flue gas is fed to a cyclone in order to separate entrained particulate matter from the ammonia treated flue gas.

To describe the improvement of the present invention, it is helpful to refer to FIG. 1's drawing of a standard cyclone. As shown in FIG. 1, the standard cyclone includes an inlet duct 10 for introducing the feed into the cyclone in a direction which is substantially tangential to the circular flow within the cyclone. The entrained particulate matter is removed from the bottom of the cyclone while the particulate free gas is removed from the top of the cyclone. The inlet duct consists of four perimeter walls which form a rectangular cross sectional area: a top wall 20, a bottom wall 22 opposite the top wall, an outside wall 24 and an inside wall 26 opposite the outside wall. The outside wall is more specifically defined herein as that perimeter wall of the inlet duct which is most nearly at a tangential angle to the circular flow within the cyclone.

The improvement of the present invention is for obtaining increased ammonia utilization or increased $NO_x$ reductions in the ammonia treated flue gas for a given volume of injected ammonia and comprises injecting the ammonia through the inside wall of the cyclone's inlet duct. Although not shown in FIG. 1, the ammonia can be injected through a nozzle configuration on the inside wall comprising one or more nozzles. In a preferred embodiment of the present invention, steam is used as a carrier gas with a mass ratio of carrier to ammonia of 1:1 to 30:1, preferably 3:1 to 8:1.

The term ammonia as employed in this description includes the compound ammonia itself, and/or ammonia containing compounds (such as ammonia carbonate which will yield ammonia upon vaporization), in aqueous solutions or otherwise.

The reason for the present invention's increased $NO_x$ reductions in the ammonia treated gas for a given volume of injected ammonia is probably a function of the fact that injecting the ammonia through the inside wall of the cyclone inlet duct reduces the resistance that the ammonia encounters against the solid particulate matter entrained in the flue gas. This in turn increases the penetration of the ammonia into the flue gas which in turn provides a better distribution of the ammonia in the flue gas prior to its entry into the cyclone.

It should be noted that the present invention can be extended to cyclone inlet ducts having cross sectional shapes areas other than the usual rectangular shape such as a duct having a circular cross section. In such a case, the ammonia would be injected through that portion of the cyclone inlet duct's perimeter which corresponds to the inside wall of a rectangular inlet duct.

It should be noted that, as taught in copending US patent application Ser. No. 08/067,752, now pending, a tradeoff of the present invention is an increased concentration of ammonia in the ammonia treated gas or increased ammonia slip. In actual operation, this tradeoff is optimized depending on the importance one assigns to ammonia utilization vis-a-vis ammonia slip. The following example is offered to demonstrate the efficacy of the present invention.

EXAMPLE

This example is the result of experimentation conducted at a commercial coal fired cogeneration facility in Stockton, Calif. The purpose of this example is to demonstrate the present invention's increased $NO_x$ reductions in an ammonia treated flue gas for a given volume of injected ammonia. This was accomplished by showing that the amount of ammonia required to reduce a flue gas $NO_x$ concentration from approximately 190 parts per million (ppm) to approximately 21 ppm is reduced as a higher percentage of the ammonia is injected through the inside wall via-a-vis the outside wall of the cyclone inlet duct. As can be seen in the following Table I, as the percentage of the ammonia injected through the inside wall vis-a-vis the outside wall is increased from 35% to 100%, the relative amount of ammonia required to achieve the $NO_x$ reduction is reduced by 26%.

TABLE I

| % of $NH_3$ Injected Through Inside Wall vis-a-vis Outside Wall | Relative Amount of $NH_3$ Required To Achieve A $NO_x$ Reduction of 169 PPM |
| --- | --- |
| 35 | 1.00 |
| 50 | 0.84 |
| 66 | 0.82 |
| 83 | 0.75 |
| 100 | 0.74 |

It should be noted that with respect to the last case where 100% of the ammonia is injected through the inside wall, when steam was used as a carrier in a mass ratio of steam to ammonia of 4:1, the amount of ammonia required to achieve the 169 ppm $NO_x$ reduction was further reduced an additional 5% to a relative amount of 0.69.

We claim:

1. In a process for reducing the concentration of $NO_x$ in a $NO_x$ containing flue gas comprising:
   (a) withdrawing the $NO_x$ containing flue gas as a portion of the combustion effluent from the combustion of a carbonaceous fuel;
   (b) injecting ammonia into the $NO_x$ containing flue gas in order to reduce the concentration of $NO_x$ in the flue gas; and
   (c) feeding the ammonia treated flue gas to a cyclone in order to separate entrained particulate matter from the ammonia treated flue gas wherein:
      (i) said cyclone includes an inlet duct for introducing the feed into the cyclone in a direction which is substantially tangential to the circular flow within the cyclone;
      (ii) said inlet duct consists of four perimeter walls which substantially form a rectangular cross sectional area;
      (iii) said four perimeter walls consist of a top wall, a bottom wall opposite the top wall, an outside wall and an inside wall opposite the outside wall;
      (iv) said outside wall is that perimeter wall of the inlet duct which is most nearly at a tangential angle to the circular flow within the cyclone;
   the improvement for obtaining increased $NO_x$ reductions in the ammonia treated flue gas for a given volume of injected ammonia comprising injecting the ammonia through the inside wall of the cyclone inlet duct.

2. The process of claim 1 wherein the ammonia is injected through a nozzle configuration on the inside wall comprising one or more nozzles.

3. The process of claim 1 wherein the ammonia is injected using steam as a carrier in a mass ratio of carrier to ammonia of 3:1 to 8:1.

4. The process of claim 1 wherein said combustion of the carbonaceous fuel occurs in a fluidized-bed boiler.

* * * * *